Oct. 18, 1960  G. JERNAKOFF  2,957,141
INTERVAL STRETCHER
Filed March 19, 1958  3 Sheets-Sheet 1
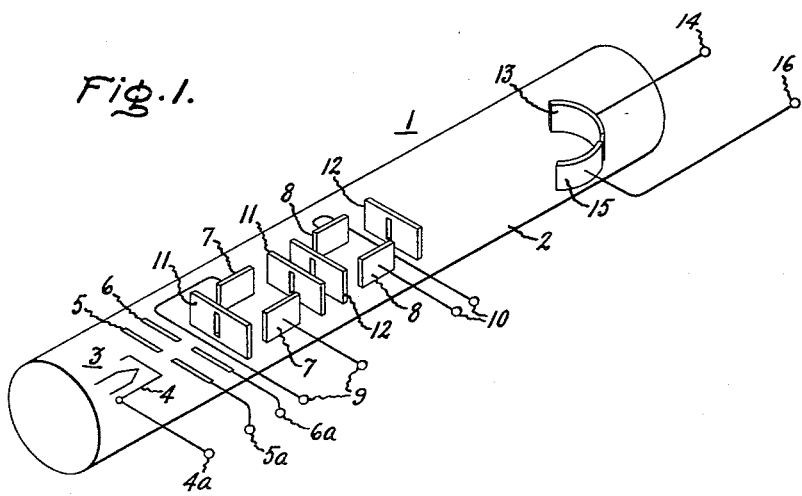
Inventor:
George Jernakoff,
by Merton D Morse
His Attorney.

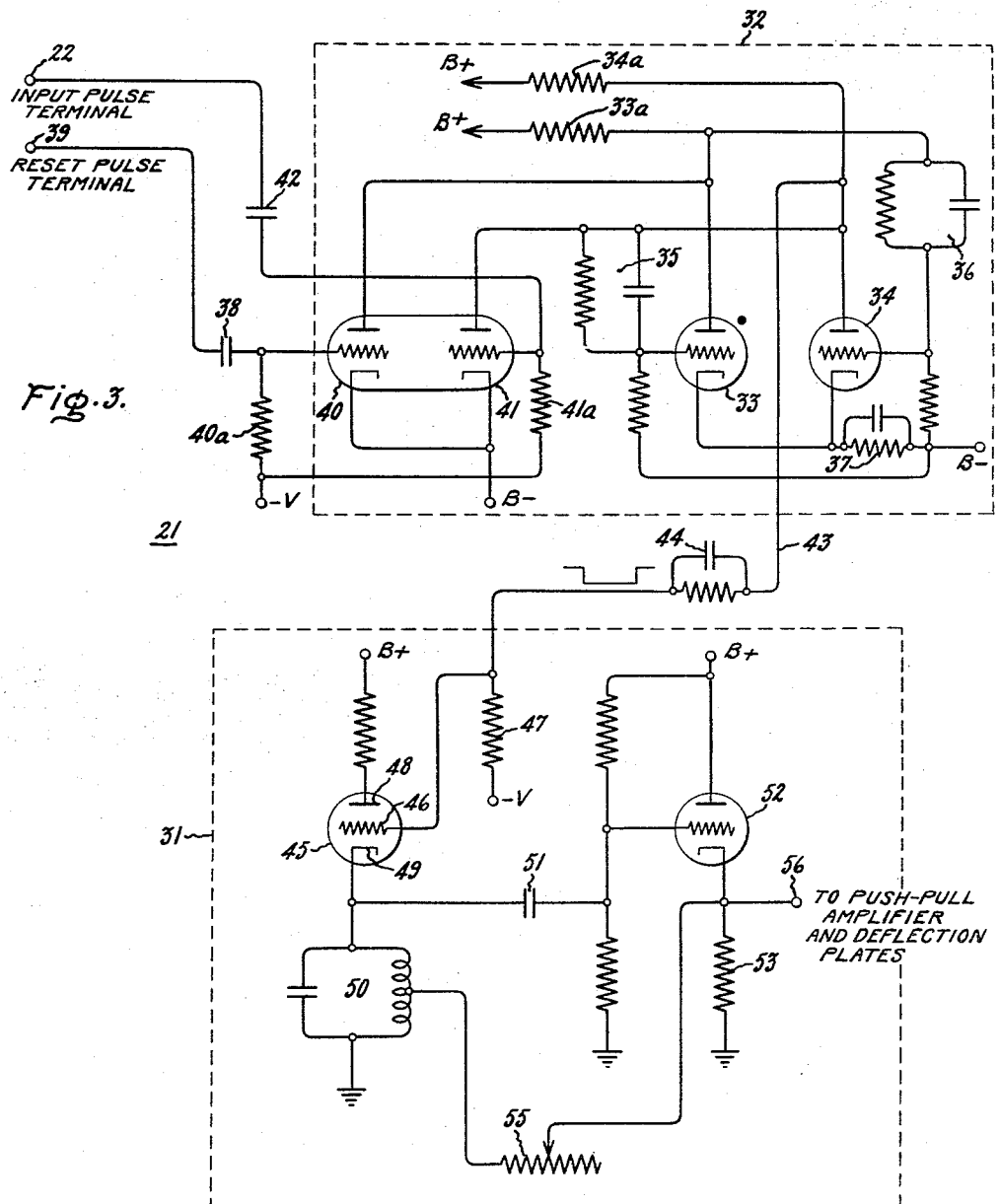

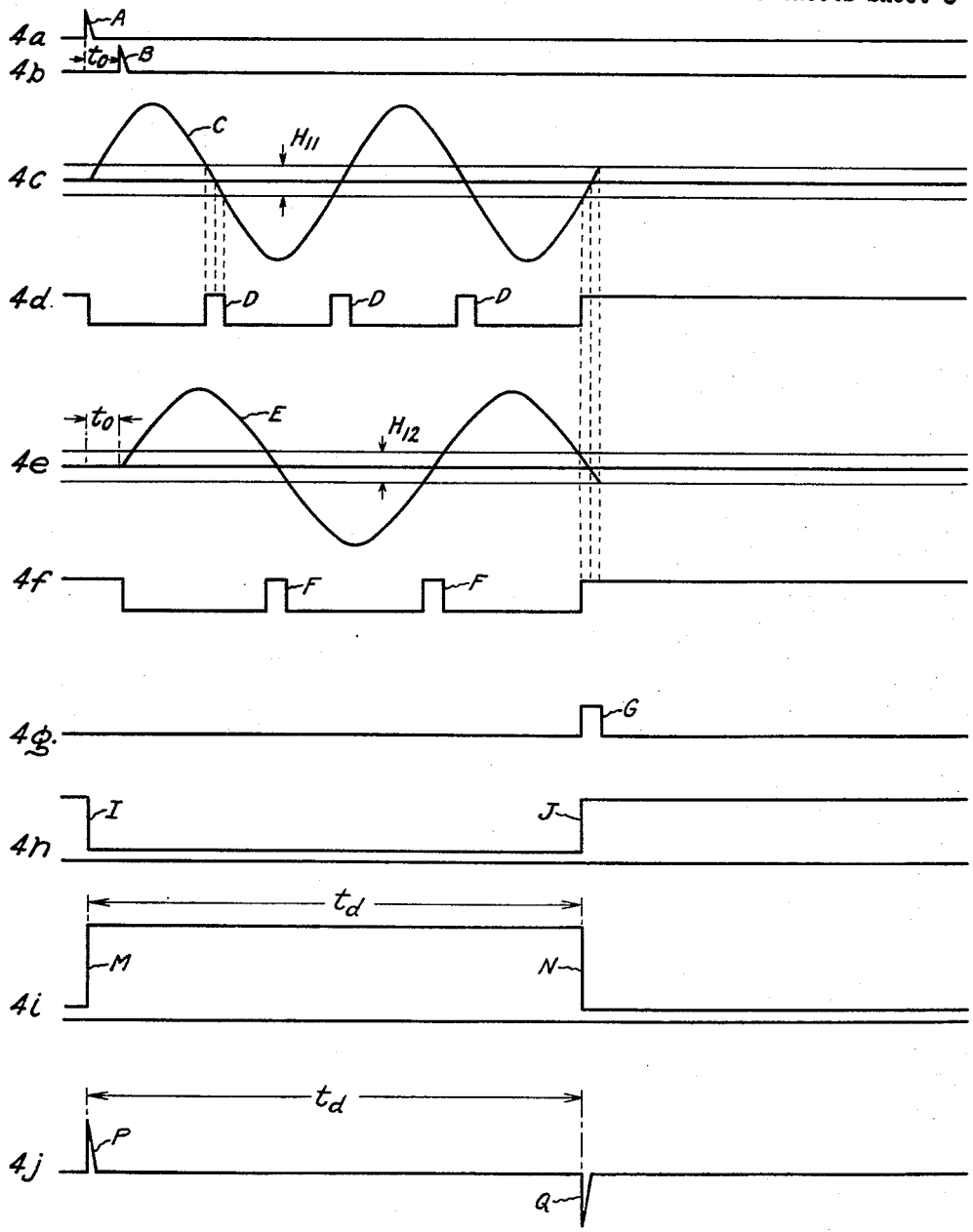

# United States Patent Office 2,957,141
Patented Oct. 18, 1960

2,957,141

INTERVAL STRETCHER

George Jernakoff, Loudonville, N.Y., assignor to General Electric Company, a corporation of New York Filed Mar. 19, 1958, Ser. No. 722,457

9 Claims. (Cl. 328—129)

This invetnion relates to a method and apparatus for producing, in response to the occurrence of two events in succession, two events spaced by a time interval greater by a predetermined amount than that interval between the first two events.

Such apparatus may be useful, for example, in measuring or reproducing the interval between the first two events where that interval is extremely small as well as in other applications.

Thus, for example, in neutron spectroscopy intervals of the order of a few milli-microseconds between events are required to be measured or to be used to control or affect other operations or effects, By producing, in response to the original events, a pair of further events spaced by an interval bearing a fixed, known, expanded relationship to the interval between the original events, many of the difficulties associated with measuring, reproducing, or controlling in response to intervals in the milli-microsecond range are obviated.

Therefore, it is an object of this invention to provide a method and apparatus for producing successive events spaced in time by a readily usable, reproducible, and measurable interval, which interval has a fixed and substantially expanded relationship to the interval between two successive original events.

It is a further object of this invention to provide a method and apparatus for generating pulses in response to events spaced by intervals in the milli-microsecond range, the spacing between the pulses thus produced being an expanded version of that between the original events.

Anther object of this invention is to provide a pulse generating apparatus for facilitating the use and measurement of extremely short time intervals between two successive events by means of simple and readily available components.

Yet another object of this invention is to provide a phase detecting electron beam device useful in producing a pair of output pulses spaced by a time interval which is an expansion of the interval between a pair of input pulses.

Still other objects and advantages of this invention will become apparent as the description of the invention proceeds.

In accord with the invention a pair of cyclically recurring voltages of different frequencies are initiated in response to the occurrence of two original events, spaced by a given interval, which events may themselves be pulses. The two voltages, being of different but fixed frequencies, achieve a definite predetermined relationship at recurring intervals, which relationship may be a fixed phase relationship, such as zero voltage phase coincidence. The occurrence of such a predetermined relationship between the voltages is utilized to produce the second of two further events, the first of which is produced upon occurrence of the first of the original events. The two further events thus produced are separated by an interval which is an expanded version of the interval between the original events.

In a preferred embodiment of the invention this is achieved by deflecting a beam of electrons in response to the cyclically recurring voltages so that the beam passes through an apertured member positioned in its path only upon occurrence of the predetermined relationship to produce the second of the two further events which are separated by the desired expanded interval.

The original event interval is thus expanded by a factor proportional to the time necessary to produce coincidence, which will be shown to be dependent on the ratio of the recurrence rate of the voltages and the time delay between the original events. In this manner the original interval may be increased by a factor of 100 or more.

The term "phase relationship" as used in this specification is defined as the angular relationship in electrical degrees between two harmonically varying electrical quantities; and zero voltage phase coincidence as that condition when two harmonically varying voltages are at 0 or 180 electrical degrees substantially at the same time and thus in a small range of voltages on either side of zero voltage.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

Figure 1 is a perspective view of an electron beam phase detection tube useful in the interval expanding system of the invention;

Figure 2 is a diagrammatic showing of the interval expanding system;

Figure 3 is a circuit diagram of the gated oscillator illustrated in block diagram form in Figure 2; and Figures 4a–4j are graphs useful in explaining the operation of the invention.

Referring now to Figure 1, there is illustrated a preferred embodiment of an electron beam tube especially adapted and constructed to provide an indication of a predetermined phase relationship between two cyclically recurring electrical outputs having different recurrence rates. This phase detection tube is utilized in the interval expanding system illustrated in Figure 2 by applying to the deflection plates thereof two cyclically recurring voltages of different frequencies, the generation of which occurs in response to the initiation and termination of an interval between two events.

To achieve this result there is provided a phase detection electron beam tube 1 comprising an evacuated envelope 2 having an electron beam source 3 positioned at one end thereof for producing a collimated electron beam. The beam source 3 comprises an electron gun including a cathode 4 and apertured focussing and accelerating electrodes 5 and 6, which may be connected to suitable energizing voltages through their respective terminals 4a, 5a, and 6a.

Positioned along the beam path is a means to deflect the electron beam at different rates in response to a pair of cyclically recurring electrical inputs. To this end two pairs of deflection plates 7 and 8 are provided and are adapted to receive first and second cyclically recurring sinusoidal voltages of frequencies $f_1$ and $f_2$ at their respective input terminals 9 and 10 and, in a well known manner, such pairs of electrodes deflects the electron beam in synchronism with their respective voltages to sweep them recurringly at right angles to the deflection plates.

Beam defining apertured members 11 and 12 positioned, respectively, on either side of the pairs of deflection plates 7 and 8 control passage of the electron beam in response to the cyclically recurring voltages. The apertured members 11 and 12 are so positioned that the beam passes through the apertures only upon zero voltage phase coincidence between the sinusoidally varying voltages. Although in Figure 1 the apertures are positioned along the optical axis to permit passage of the beam upon zero voltage coincidence, it is obvious that by positioning the apertures differently, phase relationships other than zero voltage coincidence may be utilized. In fact, the apertured members 11 and 12 may be positioned to permit passage of the beam at any electrical phase angle relationship between the voltages without going outside of the scope and true spirit of the invention.

Means to produce a pair of output pulses spaced by an interval having a duration equal to the time required to produce phase coincidence between the two voltages is provided by a secondarily emissive collecting electrode 13 positioned to intercept the beam passing through the apertured members 11 and 12. This electrode emits secondary electrons which are collected by a secondary collector electrode 15 having an output terminal 16.

In a preferred embodiment of the phase detection tube illustrated in Figure 1, the deflection plates 7 and 8 as well as the apertured means 11 and 12 are arranged to deflect the electron beam in one plane. It is readily apparent, however, that the electron beam may be deflected in two planes by providing both horizontal and vertical deflecting plates with the apertured means having correspondingly positioned apertures. In such an alternative construction the electron beam impinges on the collector electrode only upon achieving the proper phase relationship between the cyclically recurring voltages applied to the respective horizontal and vertical deflecting plates.

The phase detection tube of Figure 1 may be used to produce at its output an expanded pulse interval which is related to the original interval by a known factor.

Figure 2 illustrates such a system, in block diagram form, and includes a generating means to produce the two cyclically recurring voltages of differing frequencies in the proper sequence. All elements in Figure 2 which correspond to elements shown in Figure 1 are designated by like reference numerals. Thus, a phase detector tube 1, of the type described with reference to Figure 1, is illustrated schematically as having an evacuated envelope 2. An electron beam source 3 is positioned at one end of envelope 2 and is connected to a suitable source of energizing potential, indicated at 17 by the legend "Power supply." Positioned along the electron beam is a first pair of deflection plates 7 having input terminals 9 and a pair of beam defining apertured means 11 associated therewith. A second pair of deflection plates 8 and associated apertured means 12 permit passage of the electron beam therethrough only upon phase coincidence between the deflection voltages applied to the respective pairs of deflection plates 7 and 8. A secondarily emissive electrode 13 is positioned behind the apertured means 12 to intercept the beam and is connected through a resistance 18 to a source of energizing potential, the positive terminal of which is indicated at B+. A secondary electron collecting electrode 15 also connected to the terminal B+ of the source of energizing voltage through a resistance 19 is positioned to intercept the secondary electrons emitted from the electrode 13 to produce an output pulse at a terminal 16 representative of the phase coincidence condition within the tube.

A generating means 20 produces a pair of cyclically recurring electrical outputs, such as sinusoidal voltages for example, of different frequencies in response to the initiation and termination, respectively, of the desired interval. To this end, a gated oscillator 21, illustrated in block diagram form, is provided having an input terminal 22. A triggering pulse applied to the terminal 22 and representative of a first event and marking the initiation of the time interval gates the oscillator 21 which generates a sinusoidally varying output voltage of frequency $f_1$. The output from the oscillator 21 is connected by means of a suitable lead 23 and a push-pull amplifier 24 to the input terminals of the deflection plates 7.

A second gated oscillator 25 also shown in block diagram form, is provided with an input terminal 26 adapted to receive a pulse, representing a second event and marking a termination of the time interval, to gate the oscillator 25 which generates a cyclically recurring output voltage of frequency $f_2$. The output from oscillator 25 is applied by means of a suitable lead 27 and a push-pull amplifier 28 to the input terminals of the deflection plates 8. Thus, the electron beam is deflected by these voltages until phase coincidence between the voltages is achieved and the electron beam passes through the apertured members 11 and 12 to produce an output signal.

Upon realization of phase coincidence between the deflection voltages a reset pulse is provided at an output terminal of tube 1 which is applied to the oscillators and terminates their operation until the initiation of the next time interval. To achieve the foregoing, the output terminal 14 of the secondarily emissive electrode 13 is connected through a suitable lead 29 and a pulse amplifier 30 to the respective oscillators 21 and 25 to terminate operation thereof whenever the electron beam passes through the apertures and strikes the electrode 13. As will be explained in detail later when the operation of the system is discussed, an output pulse of the proper polarity is produced at the terminal 14 which is amplified and utilized to disable the respective oscillators and reset them for the occurrence of the next interval.

Figure 3 illustrates in greater detail circuit arrangements that may be employed in the oscillators 21 and 25 of Figure 2. Since these oscillators may be identical in construction and operation only one of these is disclosed and described in detail.

The gated oscillator 21 comprises broadly a shock excited oscillator shown within the dashed rectangle 31 and a bi-stable gating circuit within rectangle 32 which generates a gating pulse for the oscillator 21 upon receipt of a positive input trigger pulse. The bi-stable gating circuit 32 includes a pair of triodes 33 and 34 the anodes of which are connected through anode resistances 33a and 34a to the positive terminal B+ of a source of energizing voltage. The energizing voltage source, which may be of any suitable type, has a positive terminal B+, a negative terminal B— and a pair of intermediate terminals, one of which is connected to ground to establish a reference potential point and the other to a point intermediate the grounded terminal and the negative terminal B— to make available an intermediate negative voltage. The anode of each triode is coupled to the control electrode of the remaining triode by means of parallel resistance-capacitance networks 35 and 36. This cross-coupling of the anodes and control electrodes in conjunction with a common cathode resistance 37 produces the well known bi-stable multivibrator characteristics. For further discussion of this circuit reference is made to High Speed Computing Devices, Engineering Research Associates, McGraw-Hill Book Company, Inc., New York (1950), and particularly Chapter 3 which contains an excellent discussion of the principles of such bi-stable circuits.

A pair of trigger triode electron discharge devices 40 and 41 which may be mounted in a common envelope are connected respectively through coupling capacitors 38 and 42 to input terminals 39 and 22 to receive trigger pulses to initiate and terminate the gating pulse. The anodes of triodes 40 and 41 are connected respectively to the anodes of triodes 33 and 34 and through the anode resistances 33a and 34a to the positive terminal B+ of the source of energizing voltage whereas the cathodes are connected to the negative terminal B— of the same source of energizing voltage. The control electrodes of the trigger triodes 40 and 41 are connected through grid leak resistances 40a and 41a to a source of negative biasing potential which may be the intermediate terminal of energizing voltages and which is indicated at —V thus maintaining the triodes 40 and 41 normally non-conducting. The arrival of a positive pulse at terminal 22 in response to the occurrence of an event, overcomes the biasing voltage —V at the control electrode of tube 41, and tube 41 conducts causing an increase in current through the anode resistance 34a thereby applying a negative pulse through network 35 to the control electrode of normally conducting triode 33. Triode 33 becomes non-conducting interrupting current in resistance 33a raising the anode voltage and applying a positive pulse through network 36 to the control electrode of tube 34 causing it to conduct and reversing the conducting states of the two tubes. The bi-stable circuit remains in this condition by virtue of the voltage drop across the common cathode resistance 37 until the arrival of a reset pulse from the phase detector tube at the terminal 39, which causes the circuit to revert to its original state with the tube 33 conducting and the tube 34 non-conducting. Thus a negative gating pulse is produced at the anode of triode 34 which is initiated whenever triode 34 becomes conducting and terminated when it becomes non-conducting.

The gating pulse is applied through a lead 43, connected to the anode of triode 34, and a parallel resistance-capacitance network 44 to the control electrode 46 of a normally conducting triode 45. The control electrode 46 is connected through a grid resistance 47 to a terminal indicated at —V of source of biasing voltage which may also be connected to an intermediate point of the energizing voltage source referred to previously and which intermediate terminal is negative relative to a reference level such as ground. The resistances 47, 34a and the resistance element of the network 44 are connected in series between the positive terminal, indicated at B+, and the intermediate terminal, indicated at —V, of the voltage source. These resistances form a voltage dividing network which is so proportioned that the control electrode 46 is maintained substantially at ground potential causing the triode to conduct heavily.

The anode 48 of the triode 45 is connected to the positive terminal B+ of the voltage source through a suitable anode resistance while the cathode is connected to one side of a center tapped frequency determining parallel resonant L-C circuit 50, the other side of which is connected to ground. The triode 45 acts as a switch and upon appearance of the gating voltage, interrupt the flow of anode current through resonant circuit 50 to shock excite the circuit into oscillation.

In order to sustain oscillations in the resonant circuit 50 for the duration of the entire gating pulse, the oscillations from circuit 50 are coupled through capacitor 51 to the control electrode of a cathode follower 52. The anode of cathode follower 52 is anode connected to the terminal B+ of the source of energizing voltage and the cathode is connected to ground through a cathode resistance 53. A portion of the oscillations from resonant circuit 50 appear across the cathode resistance 53 and are fed back through an amplitude controlling rheostat 55 to a center tap connected to an intermediate point on the inductance of the resonant circuit 50. Since the voltage signal appearing across the cathode resistance 53 is in phase with oscillations across the resonant circuit 50 by virtue of the cathode follower action, the feed back is of the proper phase to supply losses in the circuit and sustain oscillations as long as the triode 46 is maintained non-conductive by the negative gating pulse.

Upon termination of this pulse, triode 45 once more becomes highly conductive terminating oscillations in the resonant circuit 50 and the gated oscillator 21 becomes quiescent until the arrival of the next pulse at terminal 22.

The output from the oscillator 31 appears across a terminal 56 connected to the cathode of cathode follower 52 and is applied through a suitable push-pull amplifier to the deflection plates of the phase detection tube of Figures 1 and 2.

The frequencies of the gated oscillators 21 and 25, as has been pointed out briefly with reference to Figure 2, are adjusted so that they differ slightly from each other. This slight difference in oscillator frequencies determines the interval stretching and will now be described in greater detail.

If it is assumed that the frequencies of two oscillators are $f_1$ and $f_2$ with $f_1$ larger than $f_2$, it is possible to determine the number of half cycles of oscillator $f_1$ necessary to provide phase coincidence between the two voltages; for example, zero voltage coincidence. Thus:

$$n=\frac{\frac{1}{f_1}}{\frac{1}{f_2}-\frac{1}{f_1}}=\frac{f_2}{f_1-f_2} \qquad (1)$$

where $n$=the number of half cycles of oscillation $f_1$ necessary to produce zero voltage coincidence. Equation 1, above, is valid only for the case where both oscillators are started simultaneously. If, however, there is a delay in starting oscillator of frequency $f_2$, the number $m$ of half cycles of $f_2$ for zero voltage coincidence is defined by:

$$m=\frac{\frac{1}{f_1}-t_0}{\frac{1}{f_2}-\frac{1}{f_1}}=\frac{f_2-t_0 f_1 f_2}{f_1-f_2} \qquad (2)$$

where $t_0$=the delay in starting oscillaton $f_2$, or the desired interval to be stretched. If Equation 2 is multiplied by the period of oscillator $f_1$, it becomes possible to determine the time $t_d$ at which zero coincidence occurs at the deflection plates of the phase detector tube 1. Thus:

$$t_d=m\frac{1}{f_1}=\frac{\frac{f_2}{f_1}-t_0 f_2}{f_1-f_2}=\frac{\frac{1}{f_1}-t_0}{\frac{f_1}{f_2}-1} \qquad (3)$$

Thus if, for example, the ratio of the frequencies of the two voltages $f_1$ and $f_2$ is made equal to 1.01 it is readily apparent that the original interval $t_0$ is then magnified by a factor of 100.

$$t_d=\left(\frac{1}{f_1}-t_0\right)\times 100 \qquad (4)$$

In a similar manner, it can be shown that if $f_2$ is larger than $f_1$ the delayed output pulse $t_d$ as a function of the original event interval takes the form of:

$$t_d=\frac{t_0}{1-\frac{f_1}{f_2}} \qquad (5)$$

and if $$\frac{f_1}{f_2}$$

is made equal to .99 for this latter Equation 5, the original pulse event is once again magnified by a factor of 100. Thus, these equations clearly show that by providing a pair of cyclically recurring voltages of slightly different frequencies which are applied to the deflection plates upon the initiation and termination, respectively, of the original interval, the original interval may be stretched by a factor proportional to the time necessary to produce phase coincidence between these two recurring voltages.

It will be noted that derivation of Equations 3 and 5 assumes an integral number of cycles of the timing frequency. This would tend to make the circuit critical as a function of oscillator frequency ratio settings. That is, absolute coincidence of phases between the two cyclically recurring waves would be necessary. However, by providing an aperture of finite width in the apertured members 11 and 12 absolute coincidence is not necessary since the beam passes through the aperture in a small range of voltages on either side of absolute zero coincidence.

A more detailed description of the exact mode of operation of the system of Figures 2 and 3 now follows.

Initially, before the initiation of the interval as represented by a pulse, both gated oscillators 21 and 25 are disabled and no deflection voltage is applied to the respective deflection plates 7 and 8. Hence, the electron beam is aligned with the optical axis of the tube and passes through the apertured members 11 and 12 and strikes the secondarily emissive electrode 13 producing secondary emission. Consequently, the electrode 13 is at a positive potential by virtue of the flow of current from the terminal B+ of the energizing voltage source through the anode resistance 18 to supply the secondary electrons emitted therefrom. These secondary electrons are intercepted by the electrode 15 producing a current flow through resistance 19.

At the initiation of an interval between two events such as might occur in neutron flight spectroscopy, for example, a pulse of positive polarity representing the first of the events is applied to terminal 22 of gated oscillator 21 and is shown in Figure 4a and labeled "A." This positive input pulse, as described previously with reference to Figure 3, actuates the bi-stable gating means to provide a gate voltage actuating the oscillator 21 and producing a sinusoidal output voltage of frequency $f_1$ labeled "C" in Figure 4c. This sinusoidal voltage being applied to the deflection plates 7 causes the beam to be deflected in the horizontal plane and swept back and forth across the aperture. Whenever the voltage "C" lies in a small range of voltages on either side of zero voltage, a range represented by the two lines $H_{11}$ in Figure 4c, the electron beam is aligned with the apertures in the members 11 permitting a burst of electrons in the beam to pass, a condition represented schematically in Figure 4d by the small pulses D.

At the given time $t_0$ after the first event initiating the interval, the second event occurs terminating the interval and a positive pulse representing the event and illustrated as "B" in Figure 4b is applied to the terminal 26 of the second gated oscillator 25. The positive pulse B initiates oscillation of the gated oscillator 25, producing a sinusoidally varying voltage of frequency $f_2$ represented by the curve "E" of Figure 4e. The sinusoidally varying voltage E is applied to the second pair of deflection plates 8 and varies the electron beam in its field in synchronism with the voltage E. It is clear that the electron beam in the field of deflection plates 8 passes through the second apertured means 12, represented schematically by pulse F in Figure 4f, whenever the voltage E passes through a range of values centered above zero, this range being represented by the lines $H_{12}$ in Figure 4e. It is apparent, however, that the electron beam will pass through both apertured members 11 and 12 only when the beam is located along the optical axis of the phase detection tube, a condition occurring only when there is phase coincidence between the waves C and E; that is, when both are simultaneously in the small range of voltages on either side of zero, a condition represented by the pulse G in Figure 4g. Thus, the electron beam passes through and impinges on the secondary emitting electrode 13 only upon the phase coincidence between these two voltages.

As was pointed out previously, upon the initiation of the sinusoidal voltage wave C, the electron beam no longer strikes the electrode 13, terminating secondary emission therefrom and causing a drop in its potential by virtue of the termination of the current flow through resistance 18, a condition represented by the steep edged wavefront I in Figure 4h. During the remainder of the operation; i.e., until coincidence between the waves E and C, the electron beam does not strike the electrode 13 and, as a consequence, its potential remains at a relatively low level during this period. Upon phase coincidence between the waves the electron beam once again passes through the apertured means, strikes the electrode 13 producing secondary emission and a flow of current from the source B+ to the electrode 13 to supply these secondary electrodes. Hence, the voltage at the electrode 13 rises sharply as represented by the positive going pulse front J of Figure 4h. This positive going edge appearing at the electrode 13 is applied through the pulse amplifier 30 to gated oscillators 21 and 25, disabling these oscillators and terminating oscillations. Since a finite amount of time is necessary to turn off these oscillators in response to the pulse front J there is a finite delay between the generation of the pulse front J and the corresponding rise collector electrode voltage.

Simultaneously, the potential variations at the terminal 16 of the secondary electron collecting electrode 15 is represented by the curve in Figure 4i. Thus, initially, the potential of electrode 15 is low due to the secondary current flow through the resistance 19.

Upon initiation of the oscillation C in response to pulse event A the beam is deflected and no longer impinges upon electrode 13 and, consequently, terminating secondary emission and the flow of the secondary emission current from the electrode 15 through the resistance 19. Hence, the potential of the electrode 15 rises as represented by the pulse edge front M until phase coincidence as represented by the pulse G of Figure 4g, occurs, and the beam once again strikes the electrode 13. Secondary electrons from electrode 13 are once more intercepted by the collector electrode 15 producing secondary electron current flow through the resistance 19 and a sharply negative going pulse front as shown at N in Figure 4i. Thus, there is produced at the terminal 16 of the phase detection tube 1 a positive-going pulse of duration $t_d$ which is an expanded version of the time interval $t_0$ between the original input pulses.

The output pulse appearing at the terminal 16 may then be applied to a differentiating circuit to produce a pair of pulses illustrated in 4j as P and Q the time interval between which represents an expanded version of the interval between initiation and termination of the interval it is desired to measure.

From the foregoing, it is believed apparent that a novel apparatus has been disclosed which makes it possible to measure intervals in the milli-microsecond range with relatively simple equipment by providing an apparatus for stretching the original time interval.

In describing a preferred embodiment of the instant invention the phase detection tube illustrated in Figure 1 has been utilized to provide internal stretching of the interval between two pulse events by applying to its deflection plates two slightly different frequencies, initiated respectively in response to initiation and termination of the interval. However, it is obvious to one skilled in the art, that the phase detection tube of Figure 1 may be used equally well as a phase detecting device to indicate when two cyclically recurring voltages of different frequencies initiated simultaneously are in phase coincidence. Thus, the phase detection tube of Figure 1 may be utilized in many different and varying contexts to provide this function while yet falling within the true spirit and scope of this invention.

While a particular embodiment of this invention has been shown it will, of course, be understood that it is not limited thereto since many modifications both in the circuit arrangement and in the instrumentalities employed may be made. It is contemplated by the appended claims to cover any such modifications as fall within the true spirit and scope of this invention.

What I claim as new and desire to secure by Letters Patent of the United States is:

1. The combination, in a system for producing a pair of successive pulse fronts spaced by a time interval having an expanded relationship to the interval between two successive original events, of generating means actuated in response to each of said original events to initiate a pair of cyclically recurring voltage waves, the said waves having different frequencies, means to produce a voltage pulse front at the occurrence of the first of said events and a second voltage pulse front upon occurrence simultaneously of substantially zero voltage in each of said waves, said means including an electron beam device having said voltage waves applied thereto to deflect the electron beam thereof in synchronism with said waves, the relation between the frequencies of said waves being such that the time interval between said voltage pulse fronts is substantially greater than the interval between said original events.

2. In an apparatus for producing in response to a pair of original events a pair of pulse fronts spaced by an interval which is an expanded version of that between said original events, the combination comprising generating means actuated in response to each of said original events to initiate cyclically recurring voltages of different frequencies, means to produce a voltage pulse front at the occurrence of the first of said original events and a second voltage pulse front upon occurrence of phase coincidence between said waves, said means including an electron beam tube having a beam deflection means coupled to said generating means to deflect an electron beam in synchronism with said voltages, and means positioned along said beam path to intercept said beam only upon the occurrence of said first event and phase coincidence between said voltages, the frequencies of said voltage waves being such that the time required to achieve phase coincidence and thus the interval between said pulse fronts is an expanded version of that between said original events.

3. The combination in a system for producing a pair of successive pulse fronts spaced by a time interval having an expanded relationship to the interval between two successive time spaced original events, of a phase sensitive pulse generating means including an evacuated envelope having an electron source and a collecting electrode positioned therein and establishing a beam path, deflection means positioned along said beam path to control the position of said beam, means actuated in response to each of said original events for generating a pair of cyclically recurring voltage waves of different frequencies for a plurality of cycles in response to each of said events, said generating means being actuated at different times to correspond to the occurrence of said events and being coupled to said deflection means for deflecting said beam at one cyclically recurring frequency upon occurrence of one event and also simultaneously deflecting said beam at a different cyclically recurring frequency after occurrence of the second event, means disposed along said beam path to allow said beam to impinge on said collecting electrode upon achieving a predetermined phase relationship between said voltage waves producing a pair of pulse fronts spaced by an interval which is an expanded version of that between said events, the frequencies of said voltage waves being such that the time required to achieve the predetermined phase relationship and thus the interval between said pulse fronts is greater than that between said original events.

4. The combination in a system for producing a pair of successive pulses spaced by a time interval having an expanded relationship to the interval between two successive original events, of a phase sensitive pulse generating means including an electron beam source, beam deflection means positioned along the beam path, means actuated in response to each of said original events and coupled to said deflection means for producing two voltage waves of different frequencies to deflect said beam at different cyclically recurring rates in response to each of said events, said waves being initiated at different times corresponding to the occurrence of said events, apertured means disposed along said beam path to permit passage of said beam upon the occurrence of a predetermined relationship between said voltage waves, and means positioned to intercept the beam passing through said apertured means for producing pulses spaced by an interval having a duration larger than that between the events by a factor related to the ratio of said cyclically recurring deflection rates.

5. The combination, in a system for producing a pair of successive pulses spaced by a time interval having an expanded relationship to the interval between two successive original events, of a generating means including a first gated oscillator having an input terminal adapted to receive an input triggering pulse corresponding to the occurrence of the first of said original events for producing an output voltage of frequency $f_1$ in response to one event, a second gated oscillator having an input terminal adapted to receive a further input triggering pulse corresponding to the second of said original events for producing an output voltage of frequency $f_2$ in response to the other of said events, means for detecting phase coincidence between said voltages including means coupled to said first and second gated oscillators to deflect an electron beam in synchronism with said voltages, apertured means disposed along said beam to permit passage of said beam upon occurrence of phase coincidence between said voltages, and means to intercept said beam upon passage through said apertured means to produce output pulse fronts spaced by an interval equal to the time required to produce coincidence between said voltage waves.

6. The combination in a system for producing a pair of pulses spaced by a time interval having an expanded relationship to the time interval between two closely spaced original events which comprises, means responsive to said original events to initiate successively individual cyclically varying electrical waves of different frequencies in response to the occurrence of each of the original events, and pulse generating means adapted to receive said cyclically varying waves to produce a first pulse upon initiation of the first of the cyclically varying waves and a second pulse upon the occurrence of a predetermined relationship between said individual waves, the frequency relationship between said waves being such that the time interval between said pulses is related to the time required to produce the predetermined relationship between the cyclically varying waves and is substantially greater than the interval between the original events.

7. The combination in a system for producing a pair of spaced pulses separated by a time interval having an expanded relationship to the time interval between a pair of closely spaced original events of, generating means actuated in response to each of the said original events to initiate first and second cyclically recurring electrical waves of different frequencies, said cyclically recurring waves being initiated at different times corresponding to the spacing between the original events, pulse generating means adapted to receive said cyclically varying waves to produce a first output pulse upon initiation of the first of said waves and a second output pulse upon occurrence of a predetermined relationship between said first and second waves, the relation between the frequencies of said waves being such that the time required to achieve said predetermined relationship and the time interval between said output pulses is an expanded version between said original events.

8. In a system for producing a pair of pulse fronts spaced by an interval which bears an expanded relationship to the interval between two successive time spaced original events, the combination comprising means to initiate a cyclically recurring voltage wave in response to each of said original events, said cyclic voltage waves having different frequencies and continuing for a plurality of cycles after initiation, phase sensitive pulse producing means adapting to receive said cyclic voltage waves for producing a first pulse front upon initiation of a cyclic wave upon occurrence of the first of said original events and a second pulse front only upon the occurrence of a predetermined phase relationship between said waves, the respective frequencies of said waves being such that the interval between said voltage pulse fronts is greater than that between said original events.

9. In an apparatus for producing a pair of output pulses spaced by a time interval $t_d$ which is so related to the interval $t_0$ between two original time spaced events that $t_d > t_0$, the combination comprising generating means for producing a plurality of alternations of a cyclically recurring voltage wave of frequency $f_1$ in response to the first of said events and a plurality of alternations of a cyclically recurring voltage wave of frequency $f_2$ at a time $t_0$ after occurrence of the first of said events, phase sensitive pulse generating means adapted to receive the voltage waves of frequencies $f_1$ and $f_2$ for producing a first pulse in response to initiation of the voltage wave of frequency $f_1$ and a second pulse in response to the occurrence of a predetermined phase relationship between the two voltage waves.

References Cited in the file of this patent

UNITED STATES PATENTS

| Number | Name | Date |
|---|---|---|
| 2,239,407 | Wagner | Apr. 22, 1941 |
| 2,294,659 | Herold | Sept. 1, 1942 |
| 2,321,581 | Conover | June 15, 1943 |
| 2,416,333 | Lehmann | Feb. 25, 1947 |
| 2,436,376 | Bown | Feb. 24, 1948 |
| 2,615,943 | Gouriet et al. | Oct. 28, 1952 |